United States Patent [19]

Lifshutz

[11] 4,184,282
[45] Jan. 22, 1980

[54] PADDED JAW ANIMAL TRAP

[75] Inventor: Norman Lifshutz, Meriden, Conn.

[73] Assignee: Woodstream Corporation, Lititz, Pa.

[21] Appl. No.: 858,905

[22] Filed: Dec. 8, 1977

[51] Int. Cl.² .......................................... A01M 23/26
[52] U.S. Cl. ...................................................... 43/90
[58] Field of Search .......................................... 43/90

[56] References Cited

U.S. PATENT DOCUMENTS

| | | | |
|---|---|---|---|
| 2,128,579 | 8/1938 | Corey | 43/90 |
| 2,146,464 | 2/1939 | Briddell | 43/90 |

FOREIGN PATENT DOCUMENTS

| | | |
|---|---|---|
| 26511 of 1897 | United Kingdom | 43/90 |
| 18632 of 1905 | United Kingdom | 43/90 |

Primary Examiner—Robert L. Spruill
Assistant Examiner—J. T. Zatarga
Attorney, Agent, or Firm—Holman & Stern

[57] ABSTRACT

Disclosed is a padded jaw animal trap with improved holding power in order to retain an animal caught in the trap. The padding of each jaw has a face with a concave geometrical arrangement such that when an animal is caught in the trap, the face deforms to a nearly planar surface forcing ridges of flesh on either side of the face. It is this ridge of flesh which increases the holding power of the padded jaw trap over the prior art.

10 Claims, 5 Drawing Figures

U.S. Patent  Jan. 22, 1980  4,184,282
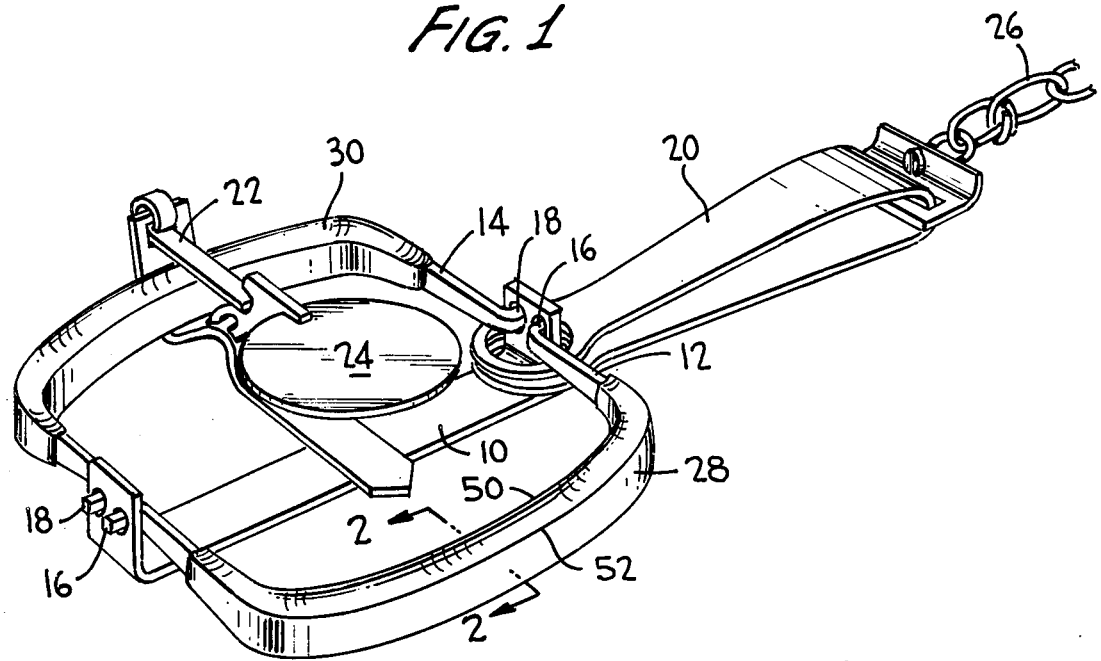
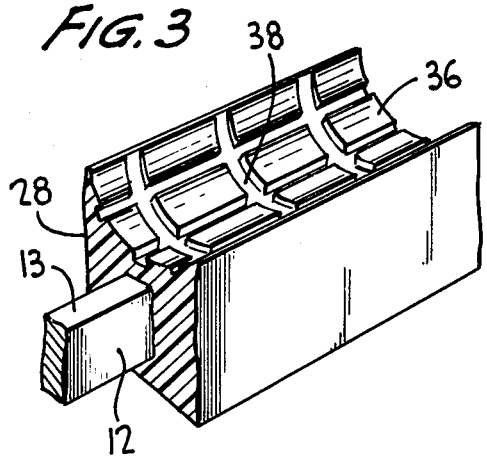
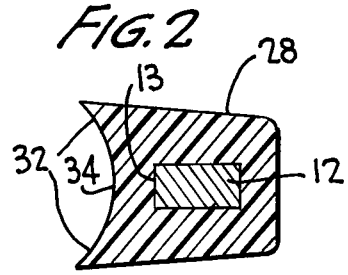
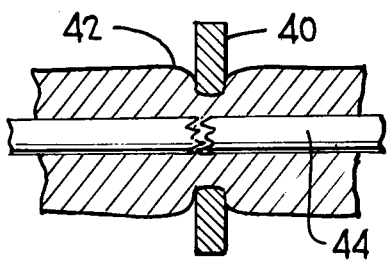
FIG. 4
(PRIOR ART)
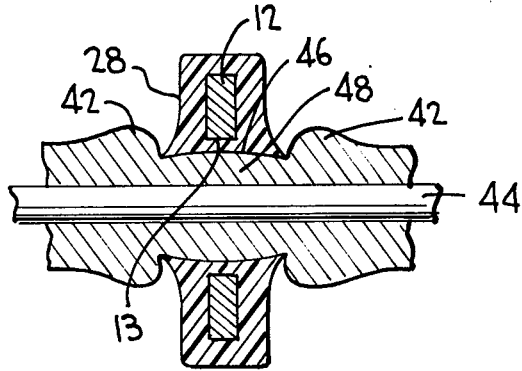

PADDED JAW ANIMAL TRAP

BACKGROUND OF THE INVENTION

The present invention relates to padded jaw animal traps generally, and specifically, to improvements in animal retention in the leg-hold type animal trap.

Animal traps have been in wide use for many years in the animal control and fur trapping industry, and are widespread in their application. Generally, a pair of jaws are biased from a set position towards a sprung position by an actuator device, which can be a spring or other means. The jaws are generally retained in a set position by a latch and trigger mechanism, wherein the animal initiates operation of the trap by actuating the trigger mechanism. Once triggered, the jaws clamp shut, retaining an extremity of the animal therebetween.

The padding of trap jaws for the animal's protection is well known, as can be seen by the following patents:

| Country | Patent No. | Patentee |
| --- | --- | --- |
| United States | 870,251 | Rasmussen |
| United States | 1,461,743 | Accola |
| United States | 1,825,193 | Maddox |
| United States | 2,128,579 | Corey |
| United States | 2,146,464 | Briddell |
| United States | 2,316,970 | O'Neil |
| United States | 3,939,596 | Webley |
| England | 18,632 | Mitchell |

In an unpadded animal trap, the retention power is provided by the pressure applied over a very narrow area (the width of the jaw) to the animal's leg. If the pressure is high enough to ensure retention of the animal, it could cause damage to the trapped appendage. Unfortunately, with the padding of animal trap jaws, and reducing the peak pressures applied to the animal's appendage (by increasing the area of the jaw with a resilient material), it is generally much easier for an animal to escape because the peak pressures have been significantly reduced, and thus, the main retention aspect of a steel jaw trap has been diminished.

It should be noted that all of the prior art padded jaw animal traps have jaw faces which are either flat or slightly convex in order to conform to the face of the steel jaw. On closing upon the appendage of an animal, such a flat or slightly convex padded jaw will deform to a distinctly convex shape, which can permit the animal to withdraw the trapped appendage. Clearly, if an existing trap is padded in the manner of the prior art, the chances of the animal's escape from such a trap are greatly enhanced. Thus, the peak pressures provided by an unpadded jaw have been necessary heretofore to successfully retain a trapped animal, minimizing the use of padded jaw traps which, while less hurtful to the animal, have been found by most trappers to be unsatisfactory. It is this difficult attempt at compromise between adequate retention properties and injury to the animal with which the instant invention is concerned.

SUMMARY OF THE INVENTION

Accordingly, in view of the prior art padded jaw trap disadvantages, it is an object of the present invention to provide a padded jaw animal trap, which is both humane and effective in retaining a trapped animal.

It is a further object of the present invention to provide a padded jaw trap of the leg-hold variety having concavely-curved jaw faces for the improved retention of an animal when in the sprung position.

It is a still further object of the present invention to provide a padded jaw animal trap with raised portions along the longitudinal edges of the jaw padding, such that upon closure over an animal's extremities, ridges of flesh are raised to reduce the rolling tendency of the padding and undesirable escape of the animal.

Another object of the present invention is to provide a padded jaw animal trap of the leg-hold variety having concavely-curved padded jaws, including a pattern on the concave face to prevent movement along the padded jaw by the animal retained in the trap.

The above, and other objects, are achieved by providing an animal trap with padded jaws, each jaw having a transverse concavely-curved face. The padding face material is resilient and, in combination with the trap actuator spring, the concave curvature and the animal extremity upon which the trap has been closed, the face material is deformed only to a flat or slightly concave surface configuration. A ridge of flesh is quickly formed by this construction adjacent the longitudinal edges of the padded jaw, such that even though the average pressure distribution of the jaws upon closure has been reduced significantly, the ridge of flesh formed by the aforementioned combination prevents the withdrawal of the animal's extremity from the trap and the tendency of the padding material to roll.

BRIEF DESCRIPTION OF THE DRAWINGS

This invention will be better understood, and objects other than those set forth above, will become apparent when considered in view of the drawings, wherein:

FIG. 1 is a perspective view of a padded trap according to one embodiment of the present invention;

FIG. 2 is a cross-sectional view along section lines 2—2 of the padded jaw in FIG. 1;

FIG. 3 is a perspective view partially in section of the jaw and padding according to a further preferred embodiment of the present invention;

FIG. 4 is a cross-sectional view of a prior art steel jawed trap; and

FIG. 5 is a cross-sectional view of a padded jaw trap in accordance with the present invention.

DETAILED DESCRIPTION OF THE PREFERRED EMBODIMENTS

Referring now to the drawings, wherein like reference numerals designate identical parts throughout the several views, and FIG. 1 illustrates the application of the present invention to a conventional leg-hold animal trap. The trap is basically comprised of a base portion 10, with pivoting jaw means mounted thereon, in a preferred embodiment jaws 12 and 14. The jaws rotate about pivot points 16 and 18, defining a pivot axis for each jaw, respectively, under the urging of an actuator means, for example spring 20. Although a long spring has been shown, clearly a coil spring or other type could be utilized. A latch means mechanism 22, holds the jaws in a set position, as illustrated in FIG. 1. When an animal presses the trigger means, in one embodiment bait pedal 24, the latch means is released, permitting spring 20 to force jaws 12 and 14 into a closed or sprung position. When the jaws have closed on an animal's extremity (the one which activated the trap through bait pedal 24), chain 26, which may be anchored to a relatively solid object and connected to the trap where shown or otherwise attached thereto such as at the center of the base portion 10 or elsewhere, prevents the trap's movement. Each of the jaws 12 and 14 are covered with a padding means, in one embodiment a resilient material 28 and 30, respectively.

FIG. 2 is a cross-section of the padding means along section lines 2—2 in FIG. 1. The jaw 12, having a jaw face 13, is surrounded by resilient material 28, having a force portion provided with means for raising a ridge of flesh in a trapped animal, which in one preferred embodiment comprises raised portions 32 and a central portion 34, with the surfaces of the raised portions being inclined downwardly towards the central portion and such that the raised portions extend beyond all remaining parts of the jaw face. Conveniently this construction is derived by forming the face portion of the resilient material with a single concavity as shown which defines the raised portions and the central portion. With this arrangement when the trap is sprung on an animal's limb, as shown in FIG. 5, the raised portions deform outwardly tending to flatten the face portion of the padding means. Although this particular embodiment shows the jaw 12 being completely surrounded by the resilient material 28, the resilient material could just as easily comprise only a partial surrounding of jaw 12. It is only necessary that the padding be retained with the jaw, such that a slight concavity is defined by the raised edge portions 32 and trough portion 34.

Although FIG. 2 shows the jaw 12 substantially centrally aligned with the center of resilient material 28, clearly, the jaw could be disposed along either side or at the back of the resilient material 28.

FIG. 3 shows a partially cross-sectional view of a padded jaw whose concave face portion 36 has a pattern means provided thereon to increase the friction of the face portion. Although this embodiment shows that the pattern means 38 is, in fact, a plurality of criss-cross recesses cut into the concavity of the resilient material 28, it is just as clear that a raised pattern on the surface of the concavity could also provide desirable increases in the friction between the face portion 36 and the animal caught in the trap. Similarly, although a criss-cross pattern means is shown in FIG. 3, many various combinations of recesses, ridges, parallel lines and pattern lines for the purpose of increasing the friction of the face portion 36 and preventing sliding of the animal in the trap, will be obvious to one of ordinary skill in the art, in view of the present disclosure.

FIG. 4 depicts the operation of a prior art unpadded trap in which the peak pressure of the jaw 40 is sufficient to raise ridges of flesh 42 (which serve to provide the holding power of the jaw). The pressures produced by such constructions might also result in fracturing of the bone in the animal's extremity as illustrated.

FIG. 5 is a cross-sectional view of one embodiment of the applicant's invention, wherein the peak pressures created by the jaw 12 are insufficient to fracture the animal's bone 44, thus, trapping the animal in a more humane manner. The original geometric concavity of face portion 36 of the resilient material 28 deforms to a non-convex curvature 46 under the pressure exerted by the jaw 12 (due to actuator spring 20) and the opposite pressure exerted by bone 44 and the surrounding flesh 48. The deformation to a non-convex curvature 46, under the pressure of jaw 12, causes ridges of flesh 42 to form quickly adjacent the raised edge portions of the padding face. These raised flesh portions 42 serve to prevent the animal from withdrawing the trapped limb, just as in an unpadded trap, although, because of the padding, there would be no fracturing of the animal's bone 44 which might occur with an unpadded trap. It should be clearly understood that such retention, as achievable by the applicant's invention, or an unpadded trap, would not be achievable with a padded trap having a resilient face portion which is deformed to a convex curvature. The convex curvature would fail to quickly raise a ridge of flesh in the animal's appendage along the edge of the padding, allowing the animal to withdraw the appendage from the trap.

Because the animal triggers the trap by inserting a limb, which actuates bait pedal 24, it is clear that the animal would be attempting to withdraw the trapped appendage in a direction away from pivot points 16 and 18 (when the jaws are in the sprung position). Thus, it is only necessary to quickly raise the ridge of flesh 42 on the side of the resilient material 28 nearest the pivot points. FIG. 5 shows a preferred embodiment raising ridges of flesh on both sides of the resilient material 28, which reduces the tendency of padding material to rollout from between the jaw and the leg.

By again referring to FIG. 1, it can be seen that the preferred embodiment has raised edge portions along the inner (with regard to the pivot axis) longitudinal edge portion 50 and the outer longitudinal edge portion 52 of the resilient material 28. There may be certain circumstances in which it is desirable to move these raised portions closer together, such that they no longer constitute "edge" portions. As long as the face portion 36 of the resilient material 28 has an initial concave curvature and, in combination with the pressure of actuating spring 20, jaw 12, and the animal whose appendage is retained, results in a non-convex curvature in the sprung or trapped position, the animal will be retained by the raised ridges of flesh according to the present invention. In a preferred embodiment, the raised portions of opposing jaws are aligned with each other in the sprung position.

It should be noted that prior art padded traps generally show either a flat or a convexly curved face, such that upon deformation (when gripping the animal's leg), the padding face forms a more or less convex curvature. It is this convex, or at least non-concave, curvature which fails to quickly raise the ridges of flesh on opposite sides of the padding material, as in this invention, permitting the animal to more easily escape from a padded trap. The concave nature of applicant's padding face, that is, raised longitudinal edge portions with a center portion which does not engage the animal's flesh on initial impact, also provides significant advantages over prior art arrangements utilizing a multiplicity of longitudinally extending ridges and valleys, since intermediate high points cause a swelling of flesh centrally of the jaw face, facilitating withdrawal of the animal's limb by minimizing the effectiveness of the ridges of flesh juxtaposed to the edges of the padding material. Therefore, applicant's concavely-curved face is the most preferred embodiment to overcome the prior art constructions with intermediate high points, or a face configuration, which would be deformed to a shape incapable of quickly forming the ridge of flesh along the padding edges, and thus, create a severe problem in trying to retain the animal in the trap.

In a preferred embodiment, a steel jaw face 13 width of one-eighth inch in the transverse direction (between inner and outer longitudinal edges) was utilized. When supplied with a concavely-curved padded material of three-eights inch in the transverse direction, the average jaw pressure went down by a factor of 0.33. However, the deformation of the concave curvature to nearly a flat surface resulted in well defined ridges of flesh on either side of the jaw face, preventing withdrawal of the trapped appendage.

Any one of a number of resilient materials such as rubbers, elastomers, copolymers, etc., either crosslinked or thermoplastic, could be utilized in providing appropriate padding material. However, in a preferred embodiment, a peroxide cured composition of an ethylene-propylene-diene rubber, reinforced with carbon black to an approximate hardness of 60 on the Shore A scale is utilized which shows advantageous properties of strength and traction, as well as resistance to permanent set and environmental degradation.

It should be noted that, although the various parameters of spring strength, face portion concavity, resilience of the padding material, etc. may change depending upon the animal to be caught, these elements would be sized to ensure that the face portion upon deformation would have a non-convex surface, ensuring retention of the trapped animal.

Although the invention has been described relative to a specific embodiment thereof, it is not so limited and many modifications and variations thereof will be readily apparent to those skilled in the art in the light of the above teachings. For example, the concavely-curved padded jaw could be applied to folding-frame animal traps, as well as the illustrated leg-hold type trap. Many different methods of removably retaining the padding on the jaws themselves could be utilized. It is, therefore, to be understood that, within the scope of the appended claims, the invention may be practiced otherwise than as specifically described.

What is claimed as new and desired to be secured by Letters Patent of the United States is:

1. In an animal trap including a pair of elongated jaw means for releasably holding an animal, the jaw means including jaw faces, an actuator means for urging the jaw means about a pivot axis from a set position to a sprung position wherein the jaw faces are juxtaposed, latch means for releasably retaining the jaw means in the set position, and trigger means for releasing the latch means, the jaw faces including padding means carried by each jaw means, the padding means including padded face portions comprised of a resilient material and juxtaposed in the sprung position of the trap, the face portions each having an inner longitudinal edge and an outer longitudinal edge with respect to the pivot axis, each of the face portions of the padding means extending beyond its respective jaw face of the jaw means towards the other jaw face in the sprung position, the improvement comprising means for raising a ridge of flesh in a portion of an animal trapped between said jaw means at least adjacent said inner longitudinal edge of each padding means, said means for raising a ridge of flesh comprising said face portions of each padding means including a resilient central portion overlying its respective jaw face and a resilient raised portion on each side of said central portion at or adjacent to said inner and outer longitudinal edges, said raised portions extending beyond all remaining parts of said face portions of the padding means toward the raised portions of the padding means of the opposite jaw means in the sprung position of said jaw means, said face portions of each padding means having an inclined surface extending between each raised portion and said central portion, said inclined surfaces causing said raised portions to deform outwardly from said central portion on contact with a portion of an animal trapped between said jaw means thereby tending to flatten said face portions to a non-convex surface.

2. An animal trap in accordance with claim 1, wherein said face portions include friction-increasing pattern means.

3. An animal trap in accordance with claim 1, wherein said padding means surrounds said jaw means.

4. An animal trap in accordance with claim 1, wherein corresponding raised portions on opposing jaws are juxtaposed in said sprung position.

5. The animal trap as defined in claim 1 wherein said face portions of each padding means define a generally concave curvature between the inner and outer edges.

6. In an animal trap including a pair of elongated jaw means for releasably holding an animal, the jaw means including jaw faces, an actuator means for urging the jaw means about a pivot axis from a set position to a sprung position wherein the jaw faces are juxtaposed, latch means for releasably retaining the jaw means in the set position, and trigger means for releasing the latch means, the jaw faces including padded face portions comprised of a resilient material and juxtaposed in the sprung position of the trap, the face portions each having an inner longitudinal edge and an outer longitudinal edge with respect to the pivot axis, each of the face portions of the padding means extending beyond its respective jaw face of the jaw means towards the other jaw face in the sprung position, the improvement wherein each of said padded face portions has a single concavity therein extending substantially from said inner longitudinal edge of the face portion to said outer longitudinal edge of the face portion such that when an animal is caught in the trap the edge portions of the concavity flex outwardly on contact with a portion of the animal and the concavity deforms to a non-convex, nearly planar surface forcing ridges of flesh to form on either side of the jaw adjacent the edge portions of the concavities of the respective face portions.

7. An animal trap according to claim 6, wherein said padding means surrounds said jaw means.

8. An animal trap in accordance with claim 6, wherein said face portion includes pattern means for increasing friction of said face portions.

9. An animal trap in accordance with claim 8, wherein said pattern means comprises criss-cross recesses formed in said face portion of said padding means.

10. An animal trap in accordance with claim 6, wherein said jaw face has a transverse dimension less than the distance between said inner and outer longitudinal edge portions of said padding means and is centrally aligned therewith in said depth dimension.

* * * * *